J. W. HARMON.
RIDING HARROW.
APPLICATION FILED DEC. 2, 1909.
1,015,887.
Patented Jan. 30, 1912.
3 SHEETS—SHEET 2.
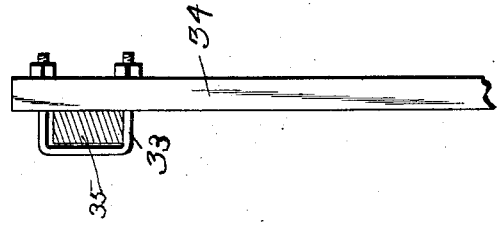
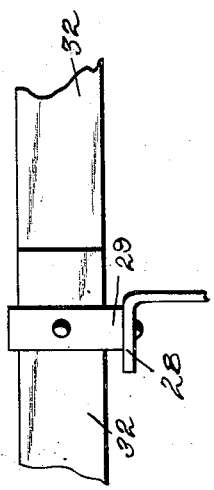
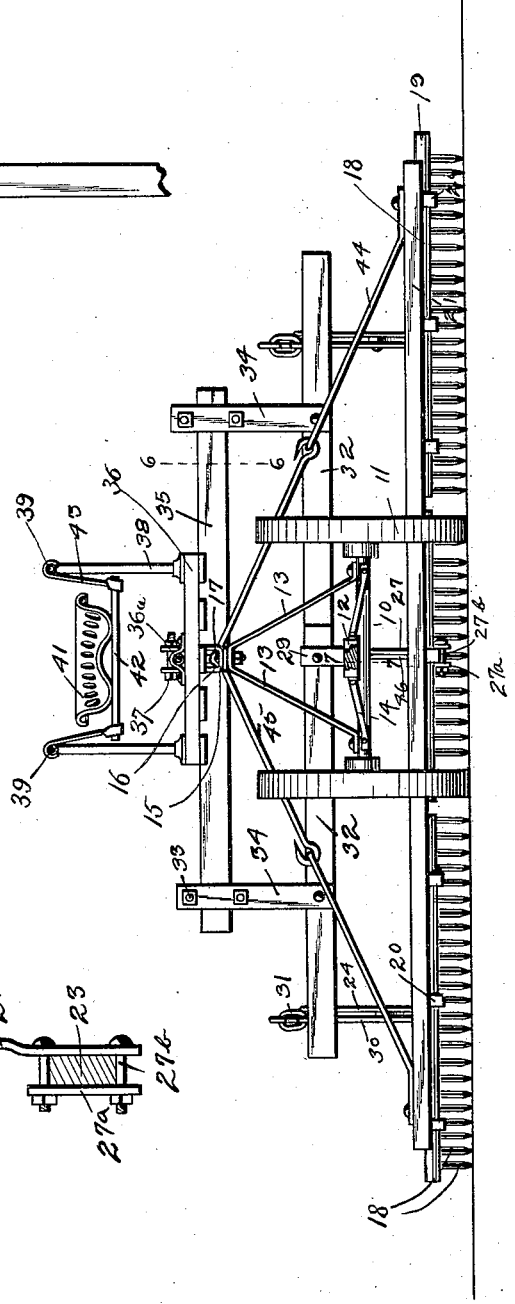
Witnesses
F. C. Caswell
W. A. Loftus.
Inventor
John W. Harmon
by Orwig & Lane Atty's

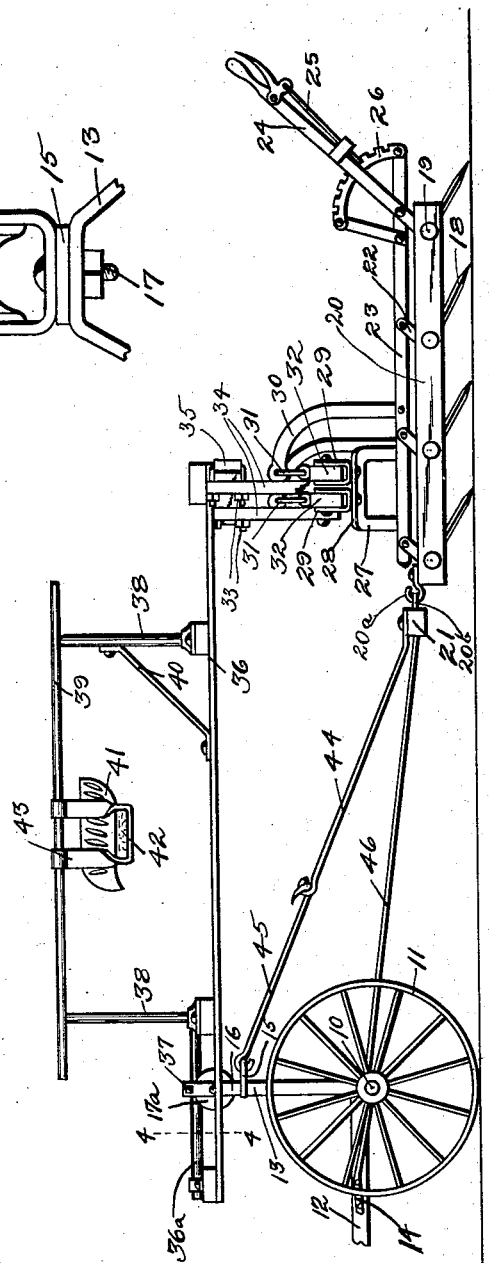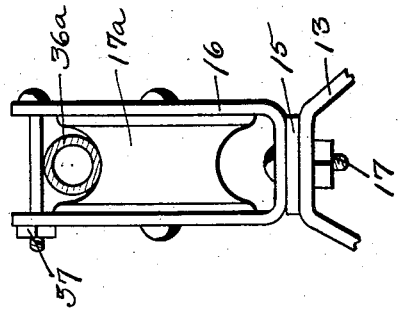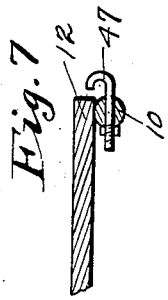

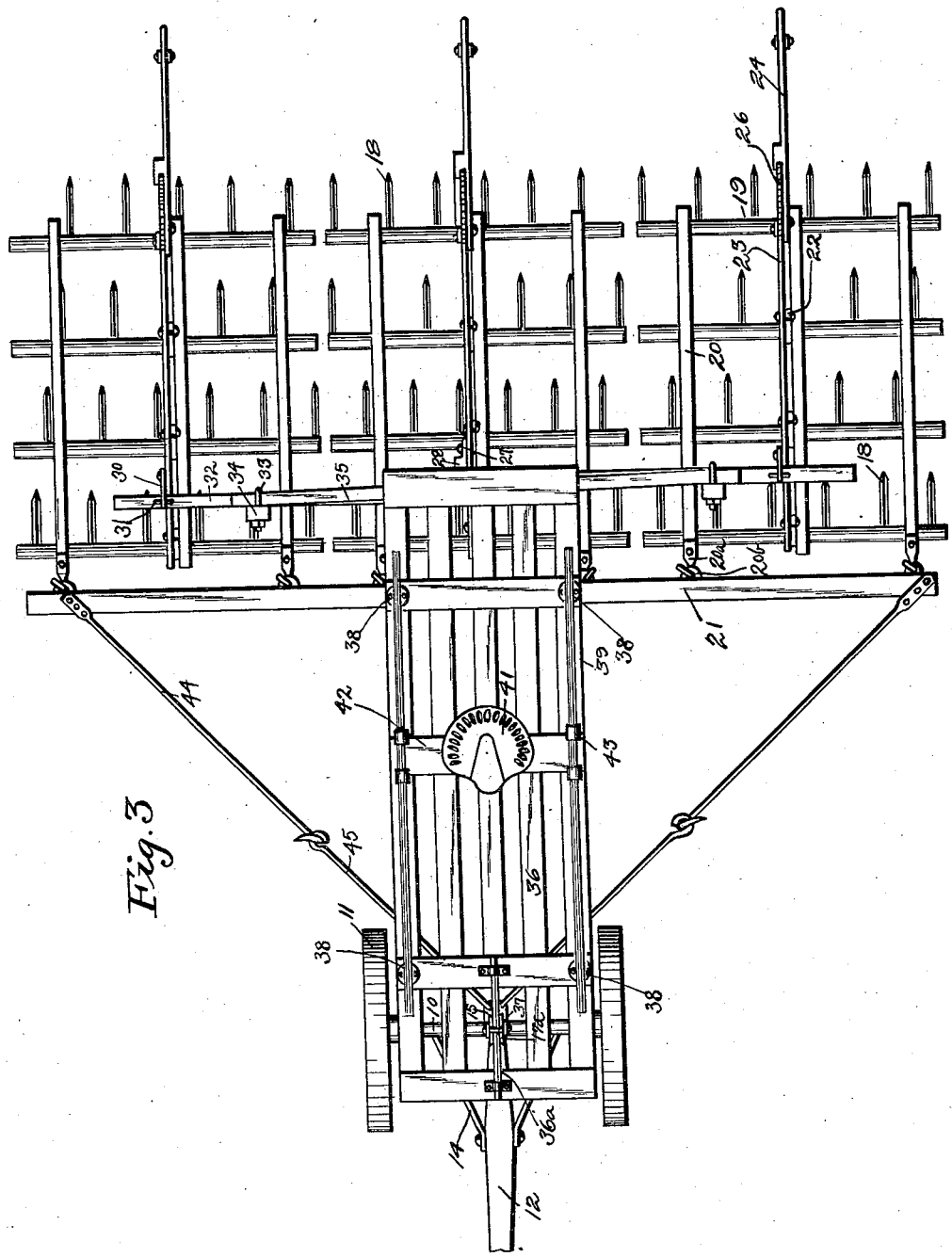

UNITED STATES PATENT OFFICE.

JOHN W. HARMON, OF CRESTON, IOWA.

RIDING-HARROW.

1,015,887.  Specification of Letters Patent. Patented Jan. 30, 1912.

Application filed December 2, 1909. Serial No. 530,993.

*To all whom it may concern:*

Be it known that I, JOHN W. HARMON, a citizen of the United States, residing at Creston, in the county of Union and State of Iowa, have invented a certain new and useful Riding-Harrow, of which the following is a specification.

The object of my invention is to provide a riding harrow, simple, durable and inexpensive in construction, and so arranged as to afford a seat for the operator, above and ahead of the dust arising from the harrow, and so designed as to distribute the weight of the platform and operator evenly on the harrow sections.

A further object is to provide a riding harrow in which the operator may quickly and easily shift his position during the use of the harrow, to thereby increase or decrease the weight on the harrow sections.

A further object is to provide a riding harrow which adapts itself to the irregular motion of the harrow sections as it is advanced over the ground.

A further object is to provide a riding harrow arranged with adjustable rods for securing the harrow sections in their correct positions relative to the truck, to thereby readjust the harrow sections to make their teeth travel in the proper paths.

A further object is to provide a riding harrow in which a tongue is used to prevent the draft animals from becoming tangled in the harrow sections.

A further object is to provide a riding harrow in which the truck section may be detached and used in connection with a disk or other farm implement.

My invention consists in the construction, arrangement, and combination of the various parts of the device whereby the objects contemplated are attained, as hereinafter more fully set forth, pointed out in my claims, and illustrated in the accompanying drawings, in which—

Figure 1 shows a side elevation of the complete riding harrow. Fig. 2 shows a front elevation of the same. Fig. 3 shows a top plan view of the same. Fig. 4 shows a detail, sectional view taken on the line 4—4 of Fig. 1. Fig. 5 shows a detail view showing the pivoted bars for equalizing the weight of the truck on the harrow sections. Fig. 6 shows a detail, sectional view taken on the line 6—6 of Fig. 2. Fig. 7 shows a detail, sectional view taken on the line 7—7 of Fig. 2.

Referring to the accompanying drawings, the reference numeral 10 indicates the truck axle mounted on the wheels 11 which supports the tongue 12 and also the upwardly extended, supporting bar 13. The brace rods 14 are fixed to the rear outer ends of the axle 10 at one end and are connected to the tongue 12 at the other. A rearwardly extending plate 15 and a bracket 16 are pivoted, by means of the bolt 17 to the upwardly extended bar 13 as shown in Figs. 1, 2 and 4 of the drawings. A grooved wheel 17$^a$ is rotatably mounted in the bracket 16. The harrow teeth 18 are mounted in the cross pieces 19 which are pivotally connected to the longitudinally extended strips 20. The hooks 20$^a$ are fixed to the said strips 20 and are attached to the eyes 20$^b$ in the draw bar 21. The upwardly extended bars 22 are fixed to the cross pieces 19 and support the bar 23 which is pivotally connected to each of the upwardly extended bars 22. The levers 24 are mounted on the rear cross pieces 19 and are pivoted near their lower ends to the bars 23, said levers 24 being provided with spring-actuated pawls 25, and said pawls being arranged to engage sectors 26 fixed to the bars 23, as shown in Fig. 1. A supporting bar 27 with an outwardly projecting flange 28 thereon is fixed to the central bar 23 by means of the clamp bar 27$^a$ and bolts 27$^b$, as shown in Fig. 5, and supports the clips 29 which are pivotally mounted thereon.

The upwardly and forwardly extended bars 30 are fixed to the central bars 23 of the outer harrow sections on which are suspended the links 31. The beams 32 are connected to the links 31 at one end and are pivotally mounted in the clips 29 at the other. The threaded rods 33 are fixed near the top of the uprights 34 which are pivotally connected to the beams 32 and support the cross beam 35. The positions of the uprights 34 on the beams 32 are such that the weight of the driver and of the truck platform is evenly distributed between the different harrow sections. The truck platform 36 is supported at its rear end by the cross beam 35 and at its forward end by the rod 36$^a$ which is fixed thereto and which is mounted in the grooved wheel 17$^a$. The bolt 37 in the bracket 16 is arranged to prevent the rod 36ª from becoming disengaged from the grooved wheel 17ª. The uprights 38 are fixed to the outer edges of the truck platform 36 and support the cross rods 39, the rear uprights being braced by the brace rods 40. A seat 41 is fixed to the cross piece 42, said cross piece being slidingly mounted on the cross rods 39 by means of the upwardly extended hooks 43. The rods 44 are adjustably connected to the draw bar 21 at one end and are connected to the plate 15 at the other end by means of the hooks 45. By adjusting these rods 44 the harrow teeth may be shifted so they will not track as the harrow is drawn forwardly. The rod 46 is fixed to the draw bar 21 at one end and detachably connected to the hook 47 at the other end which is mounted on the axle 10, as shown in Fig. 7.

In the practical operation of the device, the driver first adjusts the teeth in the harrow section, and then occupies the movable seat on the platform. As the ground is traversed the driver slides his seat forwardly or rearwardly to apply more or less weight on the harrow sections as the condition of the ground requires. The equalizing bars automatically distribute the weight to the different harrow sections, and the roller on the truck forms an adjustable bearing for the seat supporting platform, which is moved slightly forwardly and rearwardly by the unsteady motion of the harrow sections and evening bars.

I claim as my invention:

1. In a device of the class described, the combination of a harrow section, a truck in front of said harrow section, a platform supported at its forward end on said truck and at its rear end on said harrow section, supporting standards rising at each side of the platform, a pair of parallel bars supported longitudinally on said standards, a transverse member suspended from and between said bars and adapted to slide thereon, and a seat supported by said member, whereby the operator may during the operation of the harrow quickly and easily shift his position on said platform along said rods to increase or decrease the downward pressure on said harrow section.

2. In a device of the class described, the combination of a harrow section, a truck in front of said harrow section, a platform supported at its forward end on said truck and at its rear end on said harrow section, supporting standards rising at each side of the platform, a pair of parallel bars supported longitudinally on said standards, a transverse member comprising a central portion and a pair of depending end portions which are adapted to hook over said parallel bars so as to be easily slidable thereon, and a seat secured to said central portion, whereby the operator may during the operation of the harrow quickly and easily shift his position on said platform along said rods to increase or decrease the downward pressure on said harrow section.

3. In a device of the class described, the combination of a truck, harrow sections connected to the rear of said truck, equalizing bars on the harrow sections, horizontal beams supported by said bars, a pair of uprights connected with said beams at points intermediate between said equalizing bars, a cross-bar carried by said uprights, and a seat-supporting platform resting at one end on the said truck and at the other end on said cross-bar, whereby the weight of the seat-supporting platform is equally distributed on the harrow sections.

4. In a device of the class described, the combination of a truck, harrow sections, a roller rotatably mounted on the truck, a seat supporting platform mounted at one end on said roller, and at the other on the harrow sections.

5. In a device of the class described, the combination of a truck, harrow sections, means for connecting the truck and harrow sections, a bracket pivotally connected to the truck, a grooved wheel rotatably mounted in said bracket, a platform, means for mounting one end of the platform on said grooved wheel, and an upright equalizing support on the harrow sections supporting one end of the platform.

6. In a device of the class described, the combination of a truck, harrow sections, means for connecting said truck and harrow sections, a bracket pivotally mounted on the truck, a grooved wheel rotatably mounted in said bracket, a platform, a rod fixed to, extending longitudinally with and above the platform mounted on the grooved wheel, forming a support for one end of said platform, means for preventing the disengagement of said rod and grooved wheel, and an equalizing support on the harrow sections forming a support for one end of said platform.

7. In a device of the class described, the combination of a truck, a draw-bar connected with said truck, harrow sections attached to said draw bar, a bracket pivoted to the truck, a grooved wheel mounted in the bracket, a platform, a rod fixed to, extending longitudinally with and above the platform mounted on the grooved wheel, forming a support for one end of the platform, upright supports fixed to the outer harrow sections, a supporting bar fixed to the central harrow section, clips pivoted to said supporting bar, bars suspended from the upright supports on the outer harrow sections at one end, and pivotally mounted in clips on the central harrow sections at the other end, upright supports pivoted to said bars, a cross bar mounted on said upright supports forming a support for the rear end of the platform, uprights on the platform, rods extending longitudinally mounted on the uprights, and a seat slidingly mounted on said rods.

8. In a device of the class described, the combination of a truck comprising an axle, wheels mounted on the axle, a tongue fixed to said axle, and an upright support fixed to the upper side of said axle, harrow sections comprising longitudinally extended strips, tooth containing cross pieces pivotally mounted in said strips, upright levers fixed to said tooth containing pieces, operating bars pivotally connected to each of said levers, sectors fixed to the rear ends of said operating bars, spring actuated pawls on the rear levers engaging said sectors, a draw bar, hooks connecting said draw bar and harrow sections, a plate pivotally connected to said upright support, means for operatively connecting said truck with said draw-bar; supports extending upwardly then forwardly fixed to the operating bars on the outer harrow sections, a supporting bar fixed to the operating bar on the central harrow sections, clips pivoted to said support, links mounted in the ends of the upright supports on the outer harrow sections, bars suspended at one end by said links and pivotally connected at the other to the pivoted clips on the central harrow section, upright supports pivotally connected to said bars, threaded rods fixed by nuts to said upright supports, a cross beam mounted in said rods, said upright supports being pivoted in positions to evenly divide the weight on the cross bar between the different harrow sections, a bracket pivoted to the upright truck support, a grooved wheel mounted in the bracket, a platform, a rod fixed to the platform designed to travel on said grooved wheel, a bolt through the support retaining the rod in engagement with the grooved wheel, said arrangement of parts supporting said platform at one end, the other end being supported by the cross bar mounted on the harrow sections, upright supports on the platform, rods mounted on said supports, and an operator's seat slidingly mounted on said rods.

Des Moines, Iowa, Aug. 7, 1909.

JOHN W. HARMON.

Witnesses:
MILDRED B. GOLDIZEN,
MARY WALLACE.

---

Copies of this patent may be obtained for five cents each, by addressing the "Commissioner of Patents, Washington, D. C."